June 10, 1958     L. E. PARKYN     2,838,279
DEVICE FOR RAISING POWER CONDUCTOR LINES
Filed April 27, 1954
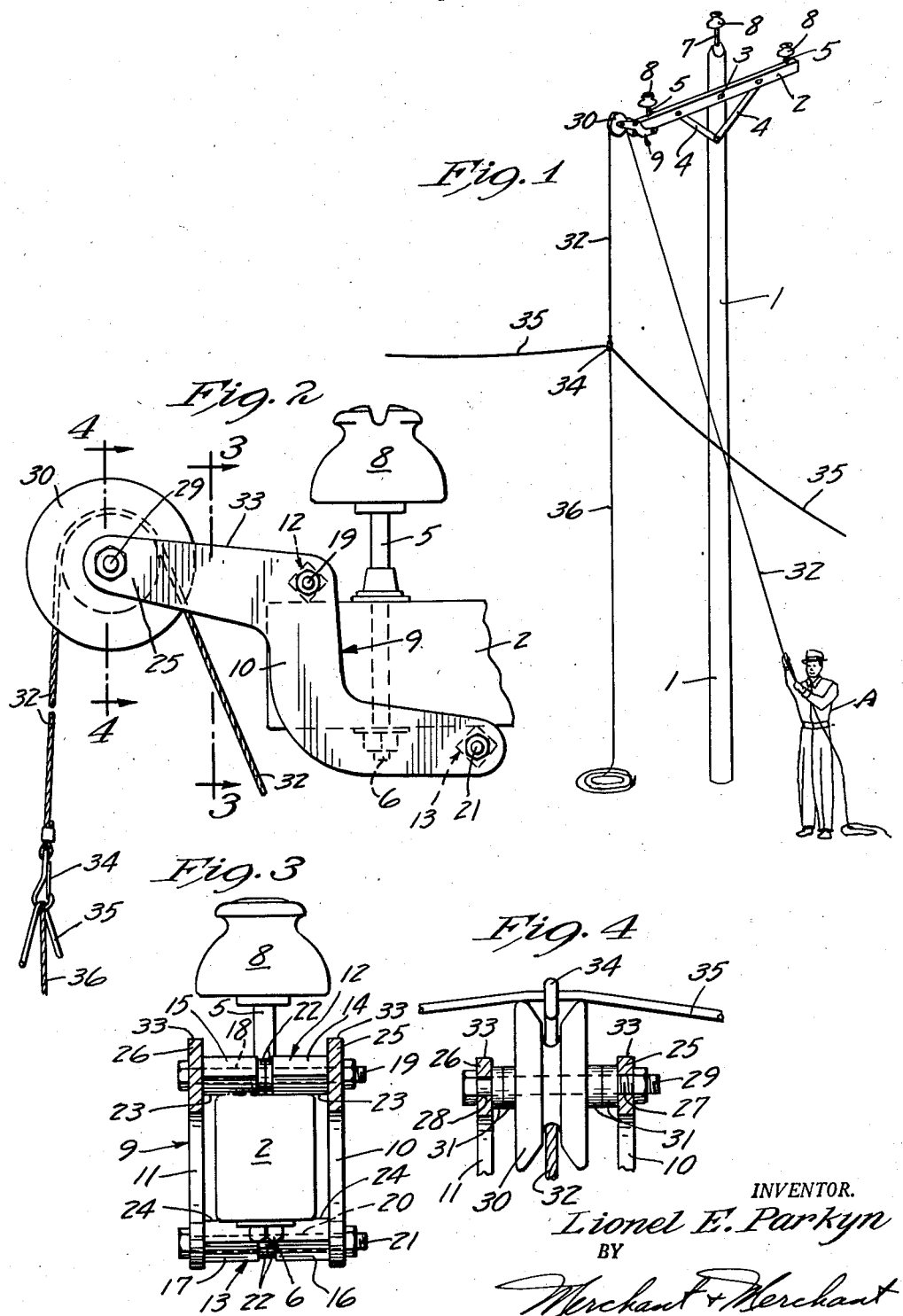
INVENTOR.
Lionel E. Parkyn
BY
Merchant & Merchant
ATTORNEYS

United States Patent Office 2,838,279
Patented June 10, 1958

---

2,838,279

DEVICE FOR RAISING POWER CONDUCTOR LINES

Lionel E. Parkyn, Waterville, Minn.

Application April 27, 1954, Serial No. 426,002

1 Claim. (Cl. 254—134.3)

My invention relates to devices for the stringing of power transmission lines, and more specifically provides a novel structure for the elevating of the power lines from the ground to the cross arm of a pole.

According to present practices, power line conductors are elevated to the cross arms by hooking the line to a block and tackle, the pulley of which has been secured to the outer end portion of the cross arm and depends therefrom. When the line has been elevated to the limit allowed by said block and tackle, it is necessary for a lineman to position himself on or below the cross arm. In either event, it is necessary for him to manually force the line outwardly and upwardly over the free end of the cross arm. In either position the task is an ardous and dangerous one because of the precarious and awkward position that the lineman is forced to assume, and additionally in view of the considerable lifting force required due to the weight of the cable or line conductor.

An important object of my invention is the provision of a novel device by which the power conductor may be elevated to the height of the cross arm and automatically to a position overlying the cross arm with the use of a rope and pulley and by a workman on the ground.

Another object of my invention is the provision of a novel device of the class above described which includes a body adapted to embrace the outer end portion of a cross arm, and which body is provided with a portion which projects outwardly therefrom longitudinally of the cross arm and has a deep groove pulley on the free end thereof mounted for rotation on a horizontal axis transversely of the cross arm, the peripheral surface of said pulley projecting radially beyond and above the free end of said portion whereby the unrestricted top of the pulley is substantially above the upper surface level of the cross arm.

A still further object of my invention is the provision of a device of the type set forth which, when mounted on a cross arm, is restrained against accidental removal.

Still another object of my invention is the provision of a device of the type described in which the upper surface of the pulley-mounting portion provides a downwardly and inwardly directed guide surface for power lines raised by and passed over said pulley.

Another object of my invention is the provision of a device as set forth which may be readily mounted on the free end portion of a cross arm and removed therefrom, which is relatively inexpensive to produce, which is relatively compact and light in weight, and which is rugged in construction and durable in use.

The above and still further highly important objects and advantages of my invention will become apparent from the following detailed specification, appended claim and attached drawings.

Referring to the drawings, which illustrate the invention, and in which like characters indicate like parts throughout the several views:

Fig. 1 is a view in perspective of a conventional power transmission pole illustrating the use of my invention;

Fig. 2 is a fragmentary view in side elevation of my device shown as being mounted on the outer end portion of the cross arm of Fig. 1;

Fig. 3 is a view partly in end elevation and partly in vertical section taken substantially on the line 3—3 of Fig. 2; and Fig. 4 is a fragmentary vertical section taken substantially on the line 4—4 of Fig. 2 but showing a different position of some of the parts.

Referring with greater detail to the drawings, the numeral 1 indicates a conventional power transmission pole to the upper end of which a cross arm 2 is rigidly secured by means of such mechanical devices as a nut-equipped bolt 3 and brace members 4. Longitudinally spaced upon the cross arm 2 are a plurality of insulator mounting screws 5 which project vertically through the cross arm 2 and which have their nut-equipped bottom ends 6 projecting below the under surface of the cross arm 2. Usually, and as shown, an insulator mounting screw 7 is driven into the upper end of the pole 1 and, like the mounting screws 5, carries one of a plurality of conventional line-supporting insulators 8.

My novel structure is in the nature of a body, indicated in its entirety by the numeral 9, which comprises a pair of elongated laterally spaced parallel side members 10 and 11 which are connected intermediate their ends and adjacent the upper edges thereof by an upper transverse member indicated in its entirety by the numeral 12. The side members 10 and 11 are connected at their inner ends by a lower transverse member indicated in its entirety by the reference numeral 13. The upper transverse member 12 comprises a pair of aligned cross sectionally rectangular fingers 14 and 15 which are rigidly secured to and project inwardly from their respective side members 10 and 11. In like manner, the lower transverse member comprises a pair of aligned cross sectionally rectangular fingers 16 and 17 which preferably are rigidly secured to and project inwardly from the inner end portions of their respective side members 10 and 11. The fingers 14 and 15 are provided with aligned passages 18 which extend longitudinally therethrough and through the side members 10 and 11, and through which extends a nut-equipped locking screw 19. The fingers 16 and 17 are likewise provided with aligned passages 20 which extend longitudinally therethrough and through the inner end portions of the side members 10 and 11, and through which extends a nut-equipped locking screw 21. For the purpose of adapting the body 9 to cross arms 2 of various widths, I provide spacing washers or the like 22 interposed between the adjacent ends of the fingers 14 and 15 and the fingers 16 and 17 whereby, when the nut-equipped screws 19 and 21 are tightened, the body 9 will be a rigid structure. The angularly disposed lower surfaces of the fingers 14 and 15 define relatively sharp longitudinally extended edges 23 which are adapted to rest upon the top surface of the cross arm 2 when the body 9 is applied to the outer end portion thereof, as indicated in Figs. 1 and 2, and tend to bite into the top surface of the cross arm 2 when a load is applied to the outer end of the body 9. Similarly, the upper angularly disposed surfaces of the rectangular fingers 16 and 17 define relatively sharp longitudinally extending edges 24 which engage the bottom surface of the cross arm 2, and which likewise tend to bite into said bottom surface when a load is applied to the outer end of the body 9. The spacing washers 22 and the length of the fingers comprising the transverse members 12 and 13 give sufficient width to the body 9 so that the side members 10 and 11 are disposed laterally outwardly from the adjacent side surfaces of the cross arm 2.

The outer ends of the side members 10 and 11, indicated at 25 and 26 respectively, are provided with aligned apertures 27 and 28 respectively through which extends a horizontal shaft in the nature of a nut-equipped bolt or the like 29 which is generally parallel to the transverse members 12 and 13. A deep groove pulley 30 is journalled on the shaft 29 and is centrally spaced between the outer ends 25 and 26 of the side frame members 10 and 11 by spacing washers or the like 31. As shown in Fig. 2, the pulley 30 is outwardly spaced sufficiently from the intermediate portion of the body 9 to permit passage between the pulley and the outer end of the cross arm 2 of a hoisting rope or cable 32 running over the pulley 30. The upper edges of the side members 10 and 11, between the transverse member 12 and the outer ends of the side frame members define guide surfaces 33 which slope longitudinally inwardly and downwardly from the pulley 30 toward the cross arm 2 when the body 9 is mounted thereon. The hoisting rope or cable 32 is provided at one end with a snap hook 34 which engages a power line 35. When the groundman, indicated at A, pulls on the hoisting rope or cable 32, the power conductor line 35 is raised upwardly to and engages the peripheral edges of the pulley 30. It will be noted by reference to Fig. 2 that the diameter and location of the pulley 30 with respect to the body 9 is such that the upper portion of the pulley 30 is substantially above the guide surfaces 33 of the side members 10 and 11 and consequently above the top surfaces of the cross arm 2. Continued pulling on the hoisting rope 32 by the groundman A causes the conductor wire 35 to ride over the top of the pulley 30 and come to rest on the guide surfaces 33 of the side members 10 and 11 after which the hook 34 is released from the conductor 35 by a lineman on the pole. The conductor 35 may thereafter be manually raised into operative position on the selected insulator 8 with relative ease. I have found it advantageous to secure a return rope or cables 36 to the hook 34 whereby the hook 34 and cable 32 may be pulled downwardly to a point where another conductor wire can be easily attached thereto for elevation to the cross arm.

From the above it should be obvious that my novel structure may be readily attached to cross arms of various dimensions. The spacing between the vertical planes of the transverse members 12 and 13 permit the operator to mount the body 9 on cross arms of various vertical thicknesses by tipping the body 9 about the axis of the transverse member 12. This tipping of the body also permits the lower transverse member 13 to engage the bottom surface of the cross arm 2 longitudinally inwardly of the lower nut-equipped end of the adjacent insulator mounting stem 5.

My invention has been thoroughly tested and found to be completely satisfactory for the accomplishment of the objectives set forth; and while I have shown and described a preferred embodiment of my novel device, it will be understood that the same is capable of modification without departure from the spirit and scope of the invention as defined in the claim.

What I claim is:

In a device for raising power transmission lines to the elongated cross arm of an upright pole, a body adapted to be removably mounted on the end portion of said cross arm, said body comprising a pair of laterally spaced side members and upper and lower transverse members, said upper transverse member being upwardly spaced from the level of said lower transverse member for reception of said cross arm therebetween, said upper and lower transverse members each comprising a pair of aligned fingers each anchored at its outer end to a respective side member and projecting inwardly therefrom, said fingers each having cooperating angular surfaces defining edges which extend longitudinally of the transverse members, said edges engaging the top and bottom surfaces respectively of said cross arm with the side members disposed outwardly of the opposite sides of the cross arm when the body is mounted thereon, means for releasably locking said fingers selectively in end to end abutting relationship or in spaced apart relationship, whereby to vary the spacing between the side members, said side members having longitudinally extended portions projecting laterally with respect to said upper transverse member, and a grooved pulley journalled between the outer ends of said extended portions for rotation on a horizontal axis generally parallel to said transverse members, said pulley being disposed relative to said upper transverse member and being of such diameter that the upper peripheral surface portion thereof lies above the horizontal plane of said upper transverse member and the extended portions of said side members, whereby the top portion of the pulley is substantially above the top surface level of said cross arm when the body is mounted thereon, said pulley being adapted to receive and support a hoisting cable, said upper transverse member being disposed in more closely spaced relation than said lower transverse member to said pulley, said edges defined by the angular surfaces of said fingers tending to bite into the adjacent upper and lower surfaces of the cross arm when a load is applied to said pulley.

References Cited in the file of this patent

UNITED STATES PATENTS

| | | |
|---|---|---|
| 461,109 | Ball | Oct. 13, 1891 |
| 1,948,123 | Miller | Feb. 20, 1934 |
| 2,194,648 | Ferrini | Mar. 26, 1940 |
| 2,210,787 | Winslow | Aug. 6, 1940 |
| 2,213,604 | Lennert | Sept. 3, 1940 |
| 2,277,386 | Brown | Mar. 24, 1942 |
| 2,553,779 | McLain et al. | May 22, 1951 |